UNITED STATES PATENT OFFICE.

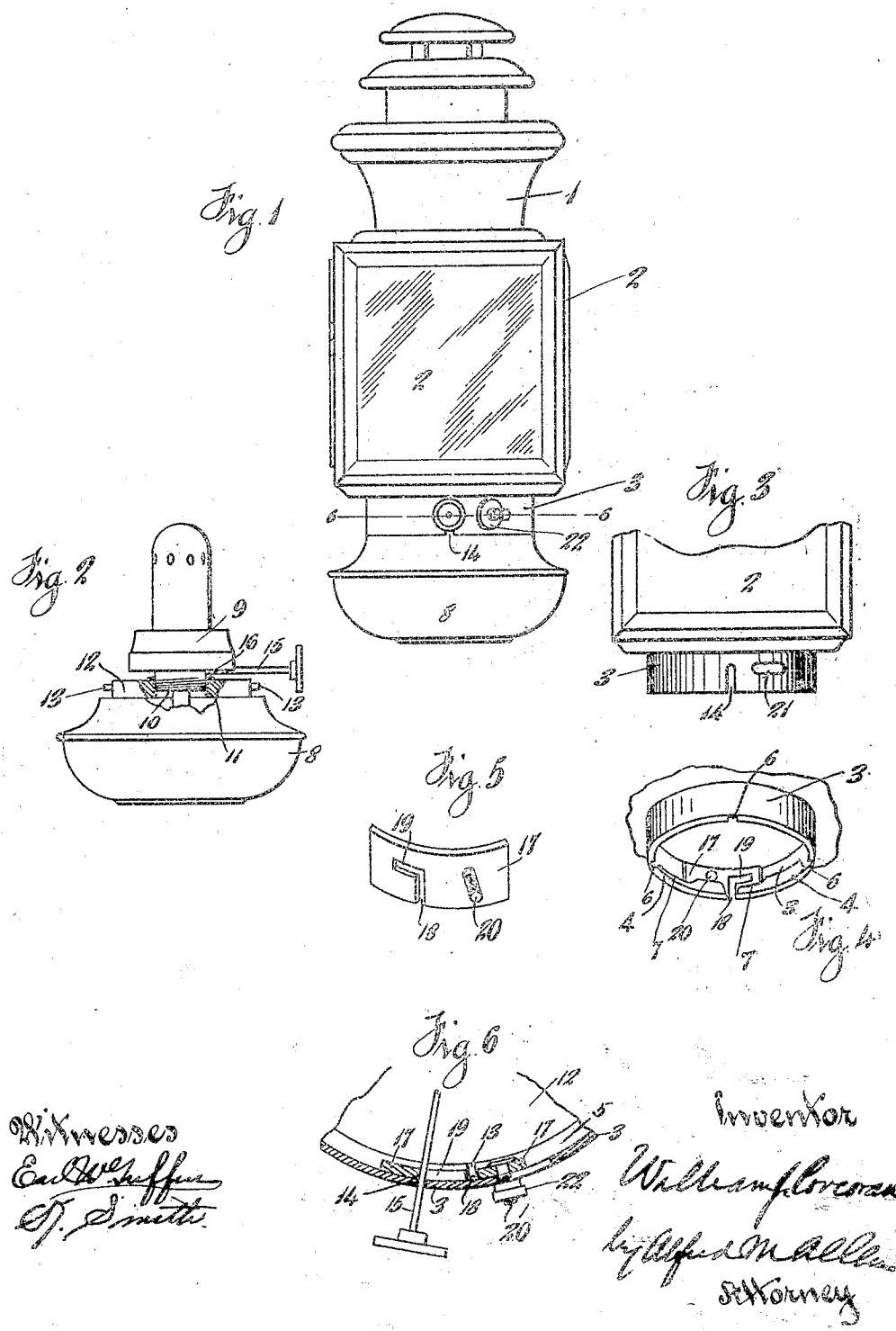

WILLIAM J. CORCORAN, OF CINCINNATI, OHIO.

VEHICLE-LAMP.

980,493.  Specification of Letters Patent.  Patented Jan. 3, 1911.

Application filed March 18, 1910. Serial No. 550,125.

*To all whom it may concern:*

Be it known that I, WILLIAM J. CORCORAN, a citizen of the United States, and a resident of the city of Cincinnati, in the county of Hamilton and State of Ohio, have invented certain new and useful Improvements in Vehicle-Lamps, of which the following is a full, clear, and exact description, reference being had to the accompanying drawing, forming a part of this specification.

My invention relates to lamps such as are used on vehicles and is especially adapted for automobiles and the like, where the lamp is subjected to continual jars when the vehicle is in use, and the special object of my invention is to provide a simple and effective means for securing the burner bowl to the lamp body, with which the parts may be effectively clamped together, without liaburner being exteriorly threaded at 10, and the top of the oil pot is correspondingly threaded on the inside of the opening 11 in the central portion of the oil pot, to which the burner is secured.

In order to secure the oil pot to the lamp body, the top 12 of the burner cap is provided with the four horizontally and outwardly extending pins 13, 13. The cylinder 3 is formed with a vertical slot 14, for the passage of the wick shaft 15. The wick shaft 15 is brought in alinement with one of the pins 13 on the oil pot by rotating the burner, and a washer 16 is mounted on the lower end of the screw threaded portion of the burner, so that the burner will not be screwed up tight on the oil pot when the wick shaft is brought in alinement with one of the pins 13, but will allow the burner or oil pot to be rotated a short distance before and the pin 13 under the wick shaft engaging the side edges of the slot 18 in the plate 17. The oil pot is then rotated and the pin 13 slides the plate 17 to the right, bringing the wick shaft 15 into the horizontal slot 19. Then the knurled head 22 is tightened and the parts are securely locked together. The clamping plate cannot move with reference to the body of the lamp, and the wick shaft cannot move, as the upper end of the slot 14 of the cylinder and the slot 19 of the plate hold the wick shaft, and the oil pot cannot move as the pin 13 is in engagement with the slot 18 of the plate. In this way, therefore, the parts are all securely locked together.

The releasing the clamping nut 22 and the turn of the oil pot releases the oil pot and the burner from the lamp. When the plate is shifted by the rotation of the oil pot, it will be noted that the vertical slot in the lamp body for the passage of the wick shaft will be covered up by the plate so as to prevent the entrance of air.

What I claim as new, and of my invention and desire to secure by Letters Patent, is:—

1. In a vehicle lamp, a lamp body, a burner with a wick shaft, and an oil pot, rotatory engaging means intermediate the oil pot and the lamp body, engaging means intermediate the burner and the oil pot which admit of slight rotation of the burner after the parts of the lamp have been assembled, a vertical slot in the lower end of the lamp body to receive the wick shaft, a slidable plate, mounted on the lamp body at said slot, also provided with a vertical slot in register with the lamp body slot when the parts are in unlocked position, said plate slot having a horizontal extension from its inner end, a pin on the oil pot engaging said plate slot, and means for locking the plate to the lamp body to lock together the lamp body, the burner and the oil pot when the parts are in engagement with each other.

2. In a vehicle lamp, a lamp body, a burner with a wick shaft, and an oil pot, rotatory engaging means intermediate the oil pot and the lamp body, engaging means intermediate the burner and the oil pot which admit of slight rotation of the burner after the parts of the lamp have been assembled, a vertical slot in the lower end of the lamp body to receive the wick shaft, a slidable plate, mounted on the lamp body at said slot, also provided with a vertical slot in register with the lamp body slot when the parts are in unlocked position, said plate slot having a horizontal extension from its inner end, a pin on the oil pot engaging said plate slot, a horizontal slot in the lamp body with a screw threaded pin on the plate engaging said horizontal slot and a clamp nut to clamp the plate to the lamp body whereby upon a relative movement of the oil pot and lamp body the parts may be locked together.

3. In a vehicle lamp, a lamp body, a burner with a wick shaft, and an oil pot between the contacts of which is situated a washer of such size as to permit slight rotation of the parts, with a screw threaded engagement between the burner and the oil pot, and a bayonet lock connection intermediate the oil pot and the lamp body, comprising pins on the oil pot and engaging devices on the lamp body, a vertical slot in the lower end of the lamp body to receive the wick shaft, and a slidable plate mounted on the lamp body with a vertical slot therein to be engaged by one of the bayonet lock pins and to register with the lamp body slot when the parts are in unlocked position, said plate slot having a horizontal extension from its inner end, a horizontal plate slot in the lamp body with a screw threaded pin on the plate engaging said slot and a clamp nut to clamp the plate to the lamp body whereby upon a relative turning movement of the oil pot and lamp body the parts may be locked together.

WILLIAM J. CORCORAN.

Witnesses:
H. R. KERANS,
E. B. CORCORAN.